(12) United States Patent
Farley et al.

(10) Patent No.: US 8,574,048 B1
(45) Date of Patent: Nov. 5, 2013

(54) COMBINE SPREADER ARRANGEMENT HAVING INDEPENDENTLY POSITIONABLE SPREADER DISKS

(75) Inventors: Herb M. Farley, Elizabethtown, PA (US); Nathan E. Isaac, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/545,404

(22) Filed: Jul. 10, 2012

(51) Int. Cl.
*A01F 12/30* (2006.01)

(52) U.S. Cl.
USPC .......................................................... 460/111

(58) Field of Classification Search
USPC .......... 460/111, 112; 239/666, 656, 668, 661, 239/657, 682, 667, 673
See application file for complete search history.

(56) References Cited

U.S. PATENT DOCUMENTS

| 2,988,368 | A | * | 6/1961 | Kerr | 239/666 |
| 4,442,979 | A | * | 4/1984 | Kupper | 239/656 |
| 5,021,030 | A | | 6/1991 | Halford et al. | |
| 5,618,002 | A | | 4/1997 | Cervelli et al. | |
| 5,797,793 | A | | 8/1998 | Matousek et al. | |
| 5,976,011 | A | * | 11/1999 | Hartman | 460/111 |
| 6,238,286 | B1 | | 5/2001 | Aubry et al. | |
| 6,251,009 | B1 | | 6/2001 | Grywacheski et al. | |
| 6,416,405 | B1 | * | 7/2002 | Niermann | 460/79 |
| 6,508,419 | B1 | * | 1/2003 | Kinkead et al. | 239/668 |
| 6,547,169 | B1 | * | 4/2003 | Matousek et al. | 239/661 |
| 6,656,038 | B1 | * | 12/2003 | Persson | 460/112 |
| 6,663,485 | B2 | * | 12/2003 | Niermann | 460/79 |
| 6,685,558 | B2 | | 2/2004 | Niermann et al. | |
| 6,719,627 | B2 | * | 4/2004 | Wolters et al. | 460/111 |
| 6,863,605 | B2 | * | 3/2005 | Gryspeerdt et al. | 460/111 |
| 6,881,145 | B2 | * | 4/2005 | Holmen | 460/112 |
| 6,893,340 | B1 | * | 5/2005 | Schmidt et al. | 460/111 |
| 6,908,379 | B2 | | 6/2005 | Gryspeerdt et al. | |
| 7,044,408 | B2 | | 5/2006 | Schoenfeld | |
| 7,306,174 | B2 | | 12/2007 | Pearson et al. | |
| 7,331,855 | B2 | * | 2/2008 | Johnson et al. | 460/112 |
| 7,487,024 | B2 | | 2/2009 | Farley et al. | |
| 7,635,299 | B2 | * | 12/2009 | Murray et al. | 460/111 |
| 8,105,140 | B2 | * | 1/2012 | Teroerde et al. | 460/112 |
| 8,146,336 | B2 | * | 4/2012 | Weichholdt et al. | 56/112 |
| 2003/0003974 | A1 | * | 1/2003 | Niermann et al. | 460/111 |
| 2003/0114207 | A1 | * | 6/2003 | Wolters et al. | 460/111 |
| 2005/0124400 | A1 | * | 6/2005 | Schmidt et al. | 460/111 |
| 2007/0015556 | A1 | * | 1/2007 | Johnson et al. | 460/111 |
| 2011/0045883 | A1 | | 2/2011 | Weichholdt et al. | |
| 2011/0053668 | A1 | | 3/2011 | Weichholdt et al. | |
| 2011/0070934 | A1 | | 3/2011 | Teroerde et al. | |

FOREIGN PATENT DOCUMENTS

| EP | 0212337 A1 | 3/1987 |
| EP | 0540889 A1 | 5/1993 |
| JP | 405076224 A | 3/1993 |

* cited by examiner

*Primary Examiner* — Árpád Fábián-Kovács
(74) *Attorney, Agent, or Firm* — Patrick M. Sheldrake (57) ABSTRACT

A spreader assembly for a combine harvester is disclosed, the assembly including a pair of disks configured to be rotated such that chaff material dropped onto the disks is spread about the combine harvester, wherein each disk is operably connected to its own motor and a spreader frame assembly. The spreader frame assembly includes a first side support pivotably connected to a frame of the combine harvester, a second side support pivotably connected to the frame of the combine harvester, and at least one disk support configured to support at least one of the pair of disks. The spreader frame assembly further defines an opening configured such that when the combine harvester is windrowing material, no portion of the spreader frame assembly interferes with the flow of windrowing material.

18 Claims, 5 Drawing Sheets

COMBINE SPREADER ARRANGEMENT HAVING INDEPENDENTLY POSITIONABLE SPREADER DISKS

TECHNOLOGY FIELD

The present disclosure relates generally to a spreader disk arrangement for a combine harvester. More specifically, the present disclosure relates to an improved spreader disk arrangement having independently positionable spreader disks.

BACKGROUND

A combine harvester, or a combine, is a machine that is used to harvest grain crops. The objective is to complete several processes, which traditionally were distinct, in one pass of the machine over a particular part of the field. Among the crops that may be harvested with a combine are wheat, oats, rye, barley, corn, soybeans, flax or linseed, and others. The waste (e.g., straw) discharged on the field includes the remaining dried stems and leaves of the crop which may be, for example, chopped and spread on the field as residue or windrowed and subsequently baled for feed and bedding for livestock.

A combine harvester cuts crop using a wide cutting header. The cut crop may be picked up and fed into the threshing and separating mechanism of the combine, typically consisting of a rotating threshing rotor or cylinder to which grooved steel bars, commonly referred to as rasp bars or threshing elements, may be bolted. These rasp bars thresh and aid in separating the grains from the chaff and straw through the action of the drum against the concaves, i.e., shaped "half drum," that may also be fitted with steel bars and a meshed grill, through which grain, chaff and smaller debris may fall, whereas the straw, being too big or long, is carried through to the outlet. The chaff, straw, and other undesired material are returned to the field via a spreader mechanism.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is separated out of the threshed crop by way of a flat oscillating cleaning system that can include a chaffer and sieves. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located atop the combine and loaded via a conveyer that carries clean grain collected in the cleaning system to the grain tank.

In normal operation, the waste product is generally expelled out the back of the combine. The waste product such as straw is either evenly spread via a set of spreader disks or windrowed for picking up via another machine such as a baler. Typically, the combine will windrow the chaff, which is generally in a first stream, discharged by a threshing rotor via a discharge beater or integral chopper and is positioned above a cleaning system. The smaller particles that pass through threshing concave grates includes the grain and the chaff, which is discharged onto the cleaning system for winnowing. The chaff is blown rearward by a cleaning fan in a second stream, which is generally below the straw path (the first stream).

Figure 1:
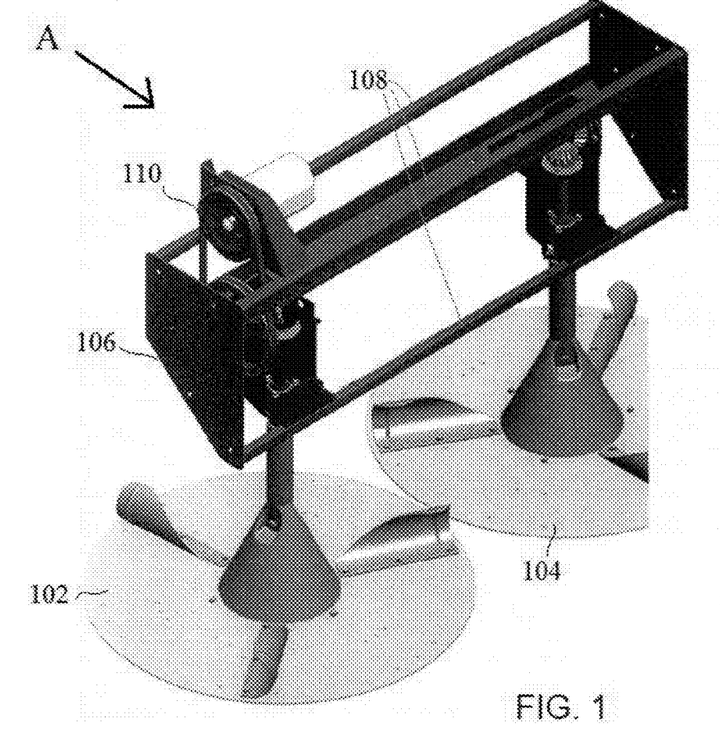
FIG. 1 is a view of an existing spreader assembly for use with a combine harvester.

FIG. 1 illustrates a typical spreader arrangement. The spreader disks 102 and 104 are attached and secured to a frame 106. The frame typically includes two or more cross-members 108 for providing support for the disks 102 and 104 when spinning. A motor 110, including a series of belts, gears or other drive systems is provided for the operation of the disks 102 and 104. A more detailed explanation of a spreader assembly is provided in U.S. Pat. No. 7,487,024, the content of which is hereby incorporated by reference in its entirety.

Generally, the chaff material flows in the direction of arrow A over the spreader disks 102 and 104, which catch a portion of the chaff and throw a portion of the chaff about the rear of the combine. When the combine is configured for windrowing, a windrow hood or other similarly apparatus diverts the flow of straw over the disks 102 and 104 and frame 106 to an opening in the back of the combine. However, as combine output has increased, this arrangement has resulted in straw and chaff back-up due to the inability of the straw to clear any frame structures and belts associated with the drive system. As such, when windrowing a large quantity of straw, a build-up can occur in the spreader disk assembly compartment, in effect building a straw bale in the compartment.

Another way to achieve windorwing requires pivoting the spreader out of the straw flow path, such as rearward and upward to allow the entire residue to discharge directly behind the combine and not be spread. Alternatively, the spreader disks could be removed from the drive shaft to windrow the entire crop residue (such as the spreader assembly as shown in FIG. 1). However, both of these configurations have the limitation that the combine cannot windrow the straw and spread the chaff simultaneously. In some instances, it may be preferable to have baled straw that is free from chaff and the chaff is discharged back onto the field by the spreader assembly to be reincorporated into the soil.

SUMMARY

Embodiments of the present invention provide a combine having a windrow door positioned above the spreader disks and configured to pivot upward and rearward to divert the first stream of straw rearward and over the spreader disks, thereby bypassing the spreader disks so that the first stream is deposited in a continuous mound behind the combine.

According to a first embodiment of the invention, a spreader assembly for a combine harvester includes a pair of disks configured to be rotated such that chaff material dropped onto the disks is spread about the combine harvester, wherein each disk is operably connected to its own motor and a spreader frame assembly. The spreader frame assembly includes a first side support pivotably connected to a frame of the combine harvester, a second side support pivotably connected to the frame of the combine harvester, and at least one disk support configured to support at least one of the pair of disks. The spreader frame assembly further defines an opening configured such that when the combine harvester is windrowing material, no portion of the spreader frame assembly interferes with the flow of windrowing material.

According to one aspect of the first embodiment, the pair of disks includes a left disk operably connected to a first motor and a right disk operably connected to a second motor.

According to another aspect of the first embodiment, the at least one support of the spreader frame assembly includes a left support arm configured to support the left disk and the first motor and a right support arm configured to support the right disk and the second motor.

According to another aspect of the first embodiment, the left disk is configured to move about the left support arm independently of the right disk, and the right disk is configured to move about the right support arm independently of the left disk.

According to another aspect of the first embodiment, the left disk and the right disk are configured to rotate about the spreader frame assembly to provide access to a cleaning system of the combine harvester or to internal working component of the combine harvester.

According to another aspect of the first embodiment, the left disk and the right disk are configured to pivot about an axial axis to fluff the material during windrowing.

According to another aspect of the first embodiment, the spreader frame assembly is configured to pivot with respect to the frame of the combine harvester such that the spreader frame assembly rotates into a storage position.

According to a second embodiment of the invention, a combine harvester includes a threshing component configured to separate usable crop material from non-usable material, a collection component connected to the threshing component and configured to collect the usable crop material, and a spreader assembly for spreading the non-usable material. The spreader assembly includes a pair of disks configured to be rotated such that chaff material dropped onto the disks is spread about the combine harvester, wherein each disk is operably connected to its own motor, and a spreader frame assembly. The spreader frame assembly includes a first side support pivotably connected to a frame of the combine harvester, a second side support pivotably connected to the frame of the combine harvester, and at least one disk support configured to support at least one of the pair of disks. The spreader frame assembly further defines an opening configured such that when the combine harvester is windrowing the non-usable material, no portion of the spreader frame assembly interferes with the flow of windrowing non-usable material.

According to another aspect of the second embodiment, the pair of disks includes a left disk operably connected to a first motor and a right disk operably connected to a second motor.

According to another aspect of the second embodiment, the at least one support of the spreader frame assembly includes a left support arm configured to support the left disk and the first motor and a right support arm configured to support the right disk and the second motor.

According to another aspect of the second embodiment, the left disk is configured to move about the left support arm independently of the right disk, and the right disk is configured to move about the right support arm independently of the left disk.

According to another aspect of the second embodiment, the left disk and the right disk are configured to rotate about the spreader frame assembly to provide access to a cleaning system of the combine harvester or to internal working component of the combine harvester.

According to another aspect of the second embodiment, the left disk and the right disk are configured to pivot about an axial axis to fluff the material during windrowing.

According to another aspect of the second embodiment, the spreader frame assembly is configured to pivot with respect to the frame of the combine harvester such that the spreader frame assembly rotates into a storage position.

According to a third embodiment of the invention, a spreader assembly for a combine harvester includes a left disk operably connected to a first motor, a right disk operably connected to a second motor, and a spreader frame assembly. The spreader frame assembly includes a first side support connected to a frame of the combine harvester, a second side support connected to the frame of the combine harvester, a left support arm configured to support the left disk and the first motor, and a right support arm configured to support the left disk and the second motor. The spreader frame assembly further defines an opening configured such that when the combine harvester is windrowing material, no portion of the spreader frame assembly interferes with the flow of windrowing material.

According to another aspect of the third embodiment, the left disk is configured to move about the left support arm independently of the right disk, and the right disk is configured to move about the right support arm independently of the left disk.

According to another aspect of the third embodiment, the left disk and the right disk are configured to rotate about the spreader frame assembly to provide access to a cleaning system of the combine harvester or to internal working component of the combine harvester.

According to another aspect of the third embodiment, the left disk and the right disk are configured to pivot about an axial axis to fluff the material during windrowing.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Figure 2:
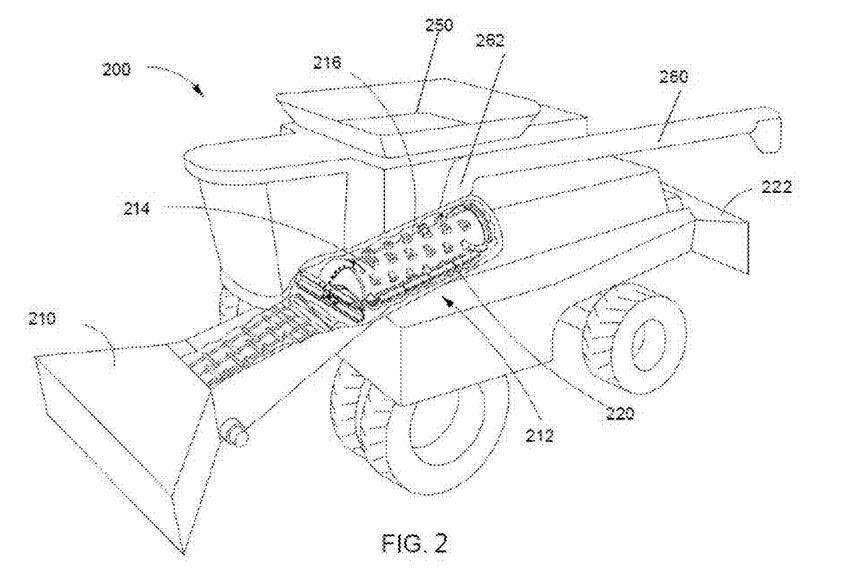
FIG. 2 is a perspective view of an exemplary combine harvester for use with the present invention.

FIG. 2 shows an exemplary agricultural combine 200, which may also be referred as a combine or harvester throughout this specification. As shown in FIG. 2, the combine 200 can include a longitudinally axially arranged threshing and separation system 212, and a concave 220 within the threshing and separation system 212. The threshing mechanism may also be of any well-known construction and operation. In some embodiments, the concave 220 may also be used with combines having transversely aligned threshing and separation system in a combine.

As shown, threshing and separation system 212 is axially arranged, in that it includes a cylindrical threshing rotor 214 conventionally supported and rotatable in a predetermined direction about a rotational axis therethrough for conveying a flow of crop material in a helical flow path through a threshing chamber 216 extending circumferentially around the rotor 214. As shown, concaves 220 may extend circumferentially around the rotor 214 and the flow of crop may pass in the space between the spinning rotor and the concaves. As the crop material flows through the threshing and separation system 212, the crop material including, for example, grain, straw, legumes, and the like, will be loosened and separated from crop residue or MOG (material other than grain) such as, for example, husks, cobs, pods, and the like, and the separated materials may be carried away from the threshing and separation system 212 in a well-known conventional manner. Crop residue can be redistributed to the field via a spreader assembly 222, located at the back of the harvester.

The remaining threshed crop, which includes the grain to be collected, is then cleaned via a cleaning system (not shown). The cleaning system can include conventional winnowing mechanisms including a fan that blows air across a series of reciprocating sieves. Through the winnowing action of the air and the reciprocating sieves, clean grain may be collected and sorted from the remaining chaff. The clean grain may be conveyed to the grain tank 250 via a cross auger that conveys grain laterally from the bottom of the cleaning system to a vertical conveyor (or elevator) that conveys grain up a load tube to be spilled into grain tank 250. At the bottom of grain tank 250, a one or more cross augers move grain laterally from the bottom of the grain tank 250 to vertical tube 262 of unload tube 260 representing a turret style system of offloading. Vertical tube 262 may include an auger for propelling grain up and to another auger within the unload tube 260. Unload tube 260 may be rotated such that it may extend its full length laterally for unloading grain from the grain tank 250 to a support vehicle, such as a truck that is driving along the side of the combine 200. Unload tube 260 may also be oriented to the rear for storage, as shown. In a swivel style offloading system (not shown), the vertical tube 262 and unload tube 260 is replaced by an unloading auger that is attached to the one or more cross augers conveying grain from the cleaning system and may pivot from side to side from the combine 200, conveying grain from the combine 200.

As discussed above, typically a first stream of straw is windrowed while a second stream of chaff is separately moved through the combine. However, it may be desirable to provide a combine configured to accommodate additional combinations. For example, it may be desirable for a combine to windrow the first stream while spreading the second stream, or to combine the two streams into either a single windrow or to spread both streams simultaneously.

In an exemplary embodiment, the present disclosure teaches a combine having a windrow door positioned above the spreader disks and configured to pivot upward and rearward to divert the first stream of straw rearward and over the spreader disks, thereby bypassing the spreader disks so that the first stream is deposited in a continuous mound behind the combine. The second stream of chaff will be spread via the spreader disks and, thus, there will be no interruption to the harvesting process. In the exemplary embodiment as illustrated in FIGS. 3 and 4A-4C, the spreader assembly does not include frame cross-members that would interrupt the flow of the first stream of straw as it transitions from either the upper or lower position to the opposite position, thereby providing a seamless transition from spreading to windrowing, and from windrowing to spreading. In other examples, removing the frame cross-members permits the spreader disk orientation to be changed (e.g., about a fore/aft axis for fluffing the windrow), or rotating the disks rearward and sideward about a vertical axis for providing axis to additional spreader assembly or combine components.

Figure 3:
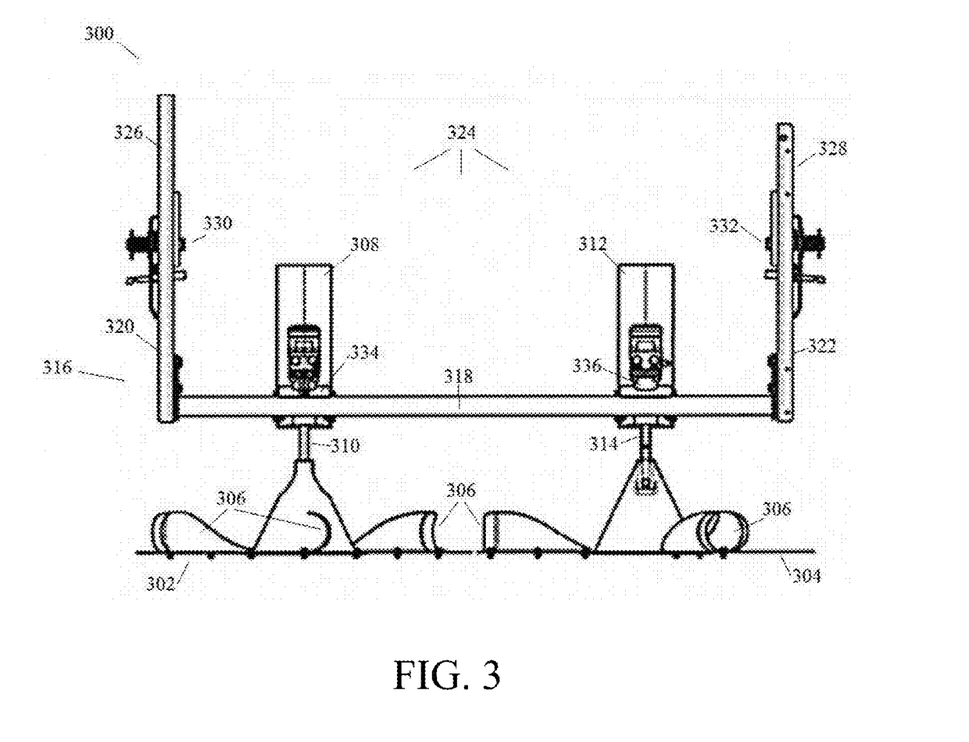
FIG. 3 illustrates an exemplary spreader disk assembly according to an embodiment of the invention.

FIG. 3 illustrates an exemplary spreader assembly 300 that reduces the problems addressed above in reference to traditional spreader assemblies, particularly straw and chaff becoming caught on cross-members of a spreader assembly frame and causing a bale to form at or near the spreader assembly, or to cause a blockage to the flow of material through the spreader assembly. The spreader assembly 300 includes two spreader disks 302 and 304. Each spreader disk 302 and 304 includes a plurality of radial ridges or paddles 306 spaced and configured to catch a portion of the chaff when the spreader disks are spinning. Spreader disk 302 is operably connected to motor 308 via a driveshaft and framing assembly 310. Similarly, spreader disk 304 is operably connected to motor 312 via a driveshaft and framing assembly 314. By providing two motors 308 and 310, each disk 302 and 304 can be operated separately. Additionally, the belts/drive assembly required in a typical spreader arrangement to power both disks from a single motor is eliminated, thereby removing the cross-shaft as one potential obstacle to straw and chaff when the combine is windrowing.

Figure 4A:
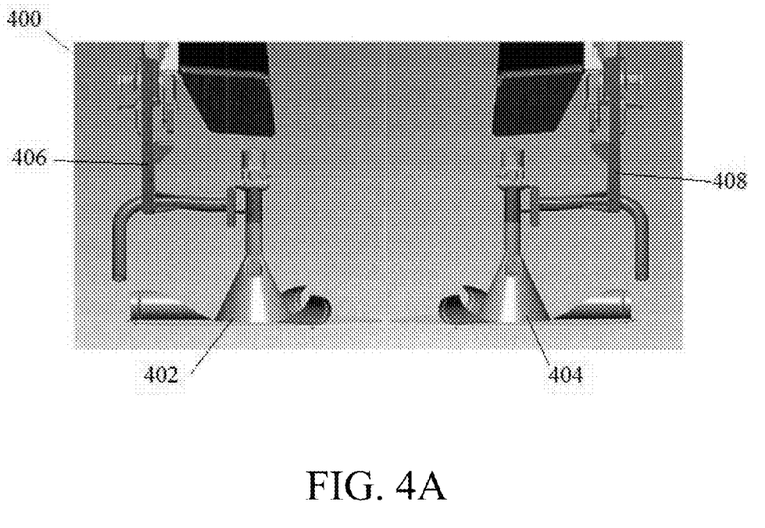
FIGS. 4A-4C illustrate various spreader disk arrangements for inclusion in a spreader assembly such as that shown in FIG. 3.
Figure 4B:
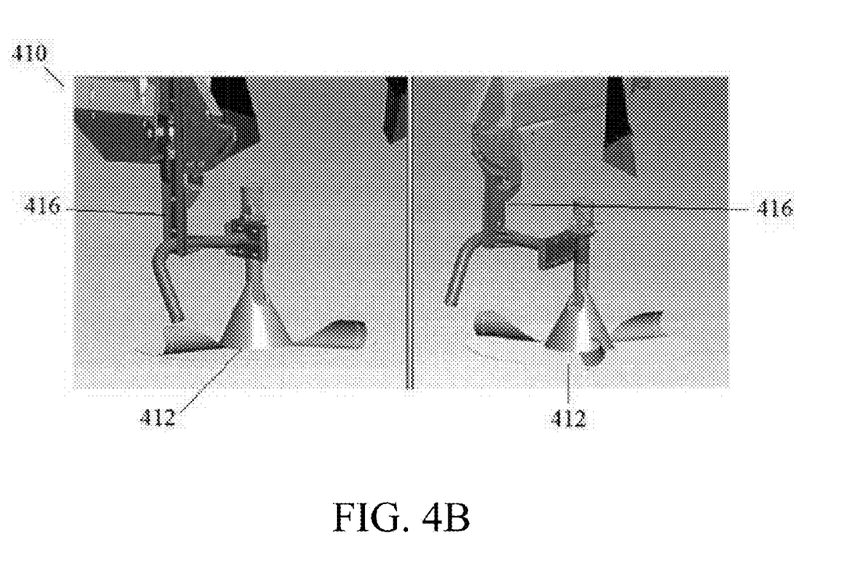
Figure 4C:
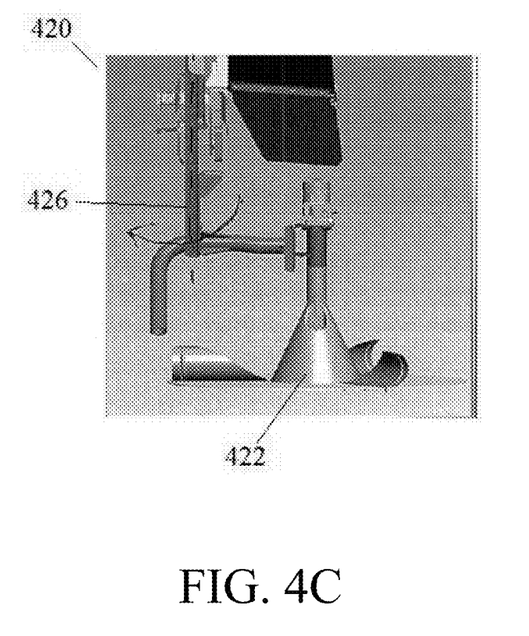

Each of disks 302 and 304 (and the associated motors and drive/frame assemblies) may be operably connected to a frame assembly 316. The frame assembly 316 may include a lower cross-member 318 as well as side-members 320 and 322. It should be noted that frame assembly 316 as shown in FIG. 3 is shown by way of example only. As shown in FIGS. 4A-4C, certain spreader assembly configurations may eliminate all cross-members.

The design of frame assembly 316 provides a large, open space 324 through which straw can pass when the combine is windrowing, thereby eliminating the prior art frame cross-members that interfered with the flow of the chaff. Additionally, the frame assembly 316 may be pivotally attached to pivot arms 326 and 328 at fixed pivot points 330 and 332. This arrangement results in the frame assembly 316 to be rotated for storage or non-use. A proximity sensor may be provided that detects when the frame assembly is rotated into the storage position and disables the motors 308 and 312, thus stopping their operation. For example, the motors 308 and 312 may be hydraulic motors. When rotated into storage position, the proximity sensor may cut off hydraulic oil flow, thereby disabling the operation of the motors 308 and 312. Similarly, the proximity sensor may cut off electricity to the motors 308 and 312 if the motors are electric motors.

Similarly, each spreader disk arrangement may be rotationally mounted onto frame assembly 316 at pivot points 334 and 336 respectively. This provides each spreader disk 302 and 304 with an independent movement relative to the other disk. Additionally, the axis of rotation about the pivot points 334 and 336 may be in the same direction of travel as the combine, thus permitting a sideways rotation of the disks 302 and 304. This arrangement allows the disks 302 and 304 to be at an angle such that the center location of the disks is lower than the outer perimeter of the disks, such that the crop material deflected onto the disks may be permitted to fall between the disks onto the ground, while some of the crop momentum is slowed by the rotating disks. This may allow the windrow material to be "fluffed" in the process, which incorporates air into the windrow for faster drying time. Positioning the disks 302 and 304 in the sideways position may be accommodated by a rigid member (e.g., a strap) with positioning holes and a latching pin to secure the disk in a desired position, or through the use of a hydraulic or electric actuator.

The position and arrangement of the various components of spreader assembly 300 provides a versatile system that overcomes many of the drawbacks of prior art approaches. As outlined above, the spreader assembly 300 eliminates the cross-members interfering with the flow of straw when windrowing. Additionally, the position of the spreader disks 302 and 304 when rotated into storage position provides an operator of the combine with access to the cleaning system at each side of the spreader assembly 300.

FIGS. 4A-4C illustrate additional exemplary embodiments for a spreader assembly. As shown in FIG. 4A, a first spreader assembly 400 includes two disks 402 and 404 independently supported with no frame cross-members. Rather, each of disks 402 and 404 is supported at each side by one of support arms 406 or 408. This permits each disk 402 and 404 to be rotated into a storage or non-use position independently of the other disk. An additional advantage of this embodiment is no cross-members to collect crop residue that may lead to blockage of the combine.

Similarly, FIG. 4B illustrates multiple isometric views of a spreader assembly 410 including a disk 412 independently mounted and supported on support arm 416. This arrangement permits rotation of the disk 412 in a first direction (e.g., rearwards) as well as about a fore/aft axis to permit sideways rotation. As before, this embodiment has no cross-members to collect crop residue that may lead to blockage of the combine.

FIG. 4C illustrates a left side of a spreader assembly 420 including a disk 422 mounted on a support arm 426. This arrangement provides the disk 422 may rotate about a vertical axis (in a similar direction to the support arm 426), thereby allowing the disk to rotate and pivot to the rear and side of the combine to provide access to the cleaning system. The right side of this arrangement is similar to the left side but in a mirrored configuration. As before, this embodiment has no cross-members to collect crop residue that may lead to blockage of the combine.

It should be noted the embodiments illustrates in FIGS. 4A-4C are shown by way of example only to illustrate the freedom of movement of the spreader disks resulting from the elimination of the frame cross-members. In addition to removing obstacles to windrowing material, the elimination of the frame cross-members provides for additional degrees of movement for the spreader disks, thereby providing new alternatives for moving the disks to storage or cleaning positions for improved access to the internal working components of the combine, as well as new alternatives for operating the disks in different positions (as discussed above with fluffing the windrow).

It should also be noted that the arrangements discussed herein are shown by way of example only, and are intended to increase the ease with which a combine customer or operator can switch from spreading to windrowing while maintaining high efficiency without sacrificing any potential performance of the combine.

Although the invention has been described with reference to exemplary embodiments, it is not limited thereto. For example, two pairs of opposing compression rollers can be employed to ensure completely crushed crop materials. Those skilled in the art will appreciate that numerous changes and modifications may be made to the preferred embodiments of the invention and that such changes and modifications may be made without departing from the true spirit of the invention. It is therefore intended that the appended claims cover be construed to all such equivalent variations as fall within the true spirit and scope of the invention.

What is claimed is:

1. A spreader assembly for a combine harvester comprising:
   a pair of disks configured to be rotated such that chaff material dropped onto the disks is spread about the combine harvester, wherein each disk is operably connected to its own motor; and
   a spreader frame assembly comprising:
      a first side support pivotably connected to a frame of the combine harvester,
      a second side support pivotably connected to the frame of the combine harvester, and
      at least a first cross-member laterally positioned between the at least first and second side supports; wherein the pair of disks and the at least one cross member define at least a portion of a path above and below the cross-member
      the pair of disks comprising a left disk operably connected to a first motor; and a right disk operably connected to a second motor;
      the at least one support of the spreader frame assembly comprising a left support arm configured to support the left disk and the first motor and a right support arm configured to support the right disk and the second motor; and
   wherein the left disk is configured to move about the left support arm independently of the right disk, and the right disk is configured to move about the right support arm independently of the left disk.

2. The assembly of claim 1, wherein the left disk and the right disk are configured to rotate about the spreader frame assembly to provide access to a cleaning system of the combine harvester or to internal working component of the combine harvester.

3. The assembly of claim 1, wherein the left disk and the right disk are configured to pivot about an axial axis to fluff the material during windrowing.

4. The assembly of claim 1, wherein the spreader frame assembly is configured to pivot with respect to the frame of the combine harvester such that the spreader frame assembly rotates into a storage position.

5. The spreader assembly of claim 1, wherein the first side support and the second side support is further configured to provide at least a portion of the path without a cross-member extending between the first side support and the second side support.

6. The spreader assembly of claim 1, wherein the spreader frame assembly further comprises a second cross-member laterally positioned between the at least first and second side supports, and wherein there is a lateral space between the first and second cross-members providing at least a portion of the crop flow path.

7. The spreader assembly of claim 1, wherein the spreader assembly further comprises at least one disk support configured to support at least one of the disks, such disk support being rotatably mounted on the at least one cross-member.

8. The spreader assembly of claim 1, wherein the spreader assembly further comprises an opening extending between the first side support and the second side support and configured to provide a path through which material flows without substantial obstruction when a portion of the material flows above the left disk and the right disk for windrowing.

9. A combine harvester comprising:
a threshing component configured to separate usable crop material from non-usable material;
a collection component connected to the threshing component and configured to collect the usable crop material; and
a spreader assembly for spreading the non-usable material, the spreader assembly comprising:
a pair of disks configured to be rotated such that chaff material dropped onto the disks is spread about the combine harvester, wherein each disk is operably connected to its own motor, and
a spreader frame assembly comprising:
a first side support pivotably connected to a frame of the combine harvester,
a second side support pivotably connected to the frame of the combine harvester, and
at least a first cross-member laterally positioned between the at least first and second side supports; wherein the pair of disks and the at least one cross member the pair of disks comprising a left disk operably connected to a first motor; and a right disk operably connected to a second motor;
the at least one support of the spreader frame assembly comprising a left support arm configured to support the left disk and the first motor and a right support arm configured to support the right disk and the second motor; and
wherein the left disk is configured to move about the left support arm independently of the right disk, and the right disk is configured to move about the right support arm independently of the left disk.

10. The combine harvester of claim 9, wherein the left disk and the right disk are configured to rotate about the spreader frame assembly to provide access to a cleaning system of the combine harvester or to internal working component of the combine harvester.

11. The combine harvester of claim 9, wherein the left disk and the right disk are configured to pivot about an axial axis to fluff the material during windrowing.

12. The combine harvester of claim 9, wherein the spreader frame assembly is configured to pivot with respect to the frame of the combine harvester such that the spreader frame assembly rotates into a storage position.

13. The combine harvester of claim 9, wherein the first side support and the second side support is further configured to provide at least a portion of the path without a cross-member extending between the first side support and the second side support.

14. The combine harvester of claim 9, wherein the spreader assembly further comprises at least one disk support configured to support at least one of the disks, the disk support being rotatably mounted on the at least one cross-member.

15. A spreader assembly for a combine harvester comprising:
a left disk operably connected to a first motor;
a right disk operably connected to a second motor; and
a spreader frame assembly comprising:
a first side support connected to a frame of the combine harvester,
a second side support connected to the frame of the combine harvester,
a left support arm configured to support the left disk and the first motor,
a right support arm configured to support the left disk and the second motor; and
at least a first cross-member laterally positioned between the at least first and second side supports; wherein the right and left disks and the at least one cross member define at least a portion of a path above and below the cross-member,
wherein the left disk is configured to move about the left support arm independently of the right disk, and the right disk is configured to move about the right support arm independently of the left disk.

16. The combine harvester of claim 15, wherein the left disk and the right disk are configured to rotate about the spreader frame assembly to provide access to a cleaning system of the combine harvester or to internal working component of the combine harvester.

17. The combine harvester of claim 15, wherein the left disk and the right disk are configured to pivot about an axial axis to fluff the material during windrowing.

18. The spreader assembly of claim 15, wherein the spreader assembly further comprises at least one disk support configured to support at least one of the disks, the disk support being rotatably mounted on the at least one cross-member.

* * * * *